Patented Oct. 30, 1951

2,573,426

UNITED STATES PATENT OFFICE 2,573,426

SILCARBANE POLYMERS AND THEIR METHOD OF PREPARATION

Joseph D. Francis, Midland, Mich., assignor to Dow Corning Corporation, Midland, Mich., a corporation of Michigan No Drawing. Application June 8, 1950, Serial No. 166,985

6 Claims. (Cl. 260—448.2)

The present invention relates to new organosilicon copolymeric fluids and to their method of production.

Heretofore, methylene linked organosilicon polymers of a relatively low molecular weight and low viscosity have been prepared.

It is an object of the present invention to produce high molecular weight, high viscosity copolymers in which the silicon atoms are linked by methylene radicals.

In accordance with the present invention a mixture of $XCH_2SiR_2X$ and $(XCH_2)_2SiRX$ is reacted with an alkali metal to produce high molecular weight, high viscosity copolymers. In the stated formulae, each X represents a halogen atom and R represents a radical each selected from the group consisting of alkyl and monocyclicaryl radicals. These copolymers contain the units

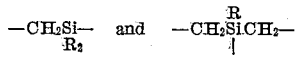

The said units are bonded together by linkages of the free carbon bonds to the free silicon bonds of said units.

The reactant $XCH_2SiR_2X$ may be prepared in a number of ways. Thus, $ClCH_2Si(CH_3)_2Cl$, may be prepared by contacting free chlorine and $(CH_3)_3SiCl$, using light to catalyze the chlorination. This method is described in U. S. Patent No. 2,510,149, dated June 6, 1950. Alternatively $(CH_3)_2SiCl_2$ or $CH_3SiCl_3$ may be similarly chlorinated to produce the equivalent chloromethylsilane. The product thereof is then reacted with an alkyl Grignard reagent, such as methyl Grignard, or with a monocyclic Grignard reagent, such as a phenyl Grignard, employing known procedures as are used for Grignard reactions.

The reactant $(XCH_2)_2SiRX$ may also be prepared in a number of ways. Thus, $(ClCH_2)_2SiCH_3Cl$ and $(ClCH_2)_2SiCl_2$ may be prepared by chlorinating $(CH_3)_3SiCl$ and $(CH_3)_2SiCl_2$ as above described. These bischloromethylsilanes are obtained as by-products which may be separated by distillation. The compound $(ClCH_2)_2SiCl_2$ may then be reacted with an equi-molar amount of an alkyl Grignard reagent, such as a methyl Grignard or a monocyclicaryl Grignard reagent, such as a phenyl Grignard to give the desired $(ClCH_2)_2SiRCl$.

The mixture employed in the present process comprises from 50 to 95 mol per cent of $XCH_2SiR_2X$ and from 5 to 50 mol per cent of $(XCH_2)_2SiRX$.

The alkali metal may be sodium, potassium, cesium, rubidium or lithium. If desired the sodium-potassium eutectic may be used. In general it is desirable to employ either sodium or potassium due to their commercial availability.

It is desirable to have the alkali metal in a finely divided state to accelerate the rate of reaction. The alkali metal may be molten alkali metal dispersed in a diluent such as a liquid aliphatic or aromatic hydrocarbon. Fine dispersion of the alkali metal in solid form in such a diluent may also be employed. Likewise, the alkali metal may be employed in the form of wire or small cut pieces.

The reaction with the alkali metal is conducted by contacting the alkali metal with the organosilicon mixture in liquid phase. The temperature at which this reaction is conducted is not critical. It may be conducted at room temperature or above. The reaction may be operated under reflux whereby the heat of reaction is dissipated by the cooling of the refluxing solvent, or the heat may be dissipated by indirect heat exchange at below reflux temperature. Following reaction of the mixture with the alkali metal, the alkali metal salt formed by the reaction is removed by filtration. The filtrate may then be distilled to remove the more volatile, lower weight portions of the product. The remaining residue is the desired high molecular weight copolymer.

The principal products of the present invention are fluid copolymers containing from 50 to 95 mol per cent of the units

and from 5 to 50 mol percent of the units

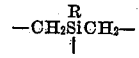

The said units are bonded together by linkage of the free carbon bonds to the free silicon bonds of said units. These copolymers are oils of a high molecular weight and vary in viscosity from 300 centistokes to more than 15,000 centistokes. It was noted that as the amount of the reactant $(XCH_2)_2SiRX$ increased, the viscosity of the resulting product increased. These products make excellent lubricants. They are of utility as hydraulic fluids, damping fluids, water-proofing fluids, and as electrical insulating fluids, such as transformer oils. These fluids are also of utility for the prevention of foaming in aqueous and non-aqueous systems.

The following examples illustrate the method of the present invention.

Example 1

A mixture of 17.75 parts by weight of $(ClCH_2)_2SiCH_3Cl$ and 271.7 parts of $ClCH_2Si(CH_3)_2Cl$ was prepared. This mixture was gradually added to 95.3 parts of molten sodium suspended in 433 parts of refluxing toluene. This reaction was exothermic, and the heat of reaction was dissipated by air blowing. The mixture was added during three hours. During this time the reaction mixture was stirred. The temperature rose to between 100 and 110° C., which temperature was maintained for three to four hours. The slurry produced was then filtered, and the filtrate stripped of toluene and distilled. There were obtained 16.8 parts of a fluid product boiling from 111 to 162° C. at 24 mm. pressure. A fluid residue of 90.7 parts was obtained. This product had a refractive index of 1.5059 at 25° C., a density at 25° C. of 0.9070, a specific refraction of 0.3275 and a viscosity of 308 centistokes at 25° C. The average molecular weight of the product was 850.

Example 2

35.5 parts by weight of $(ClCH_2)_2SiCH_3Cl$ and 257.5 parts of $ClCH_2Si(CH_3)_2Cl$ were mixed and gradually added to 96.6 parts of molten sodium suspended in 520 parts of toluene. This reaction evolved considerable heat which was dissipated by air blowing. After all the mixture had been added, the slurry which had formed was heated and stirred for 4 hours. The slurry was then filtered and the filtrate stripped of toluene and distilled. A low boiling product was obtained which boiled from 60 to 126° C. at 24 mm. pressure. A fluid residue of 92 parts was obtained. This fluid was an oil which had a refractive index of 1.5074 at 25° C., a density of 0.9170 at 25° C., a specific refraction of 0.3247 and a viscosity of 415 centistokes at 25° C. This oil had an average molecular weight of 937.

Example 3

A mixture was prepared of 228.8 parts by weight of $ClCH_2Si(CH_3)_2Cl$ and 71 parts of $(ClCH_2)_2SiCH_3Cl$ and gradually added to 96.6 parts of molten sodium suspended in 346.4 parts of refluxing toluene. The reaction was exothermic and the heat was dissipated by air blowing. The slurry which had formed was heated for 3 hours at a temperature of 100 to 110° C. The slurry was then filtered and the filtrate stripped of toluene and distilled. Distillation removed a low boiling product which boiled in the range of 47° to 160° C. at 25 mm. pressure. There was also obtained 93 parts of a residue. This product was a fluid with a refractive index of 1.4682 at 25° C., a density of 0.9281 at 25° C. and a specific refraction of 0.3330. This fluid had a viscosity of 996 centistokes at 25° C. and an average molecular weight of 1105.

Example 4

A mixture was prepared of 88.5 parts by weight of $(ClCH_2)_2SiCH_3Cl$ and 214.5 parts of $ClCH_2Si(CH_3)_2Cl$ This mixture was gradually added to 103.5 parts of molten sodium suspended in 520 parts of refluxing toluene. The reaction was exothermic and the heat was dissipated by air blowing. This mixture was then heated for 3 hours at a temperature of from 100 to 110° C. The slurry which had formed was filtered and the filtrate stripped of toluene and distilled. A low boiling product was first removed, following which about 100 parts of a residue were obtained. This product was a fluid with a refractive index of 1.1156 at 25° C. and had a viscosity of 2003 centistokes at 25° C. The average molecular weight of this fluid was 1134.

Example 5

A mixture was prepared of 124.25 parts by weight of $(ClCH_2)_2SiCH_3Cl$ and 185.9 parts of $ClCH_2Si(CH_3)_2Cl$. This mixture was gradually added to 108.1 parts of molten sodium suspended in 520 parts of refluxing toluene. The reaction was exothermic and the heat was dissipated by air blowing. The reaction mixture was heated for 4 hours at a temperature of from 100 to 110° C. The slurry which had developed was filtered and the filtrate stripped of toluene and distilled. A low boiling product was first removed at 25 mm. pressure following which about 80 parts of a residue were obtained. This latter product was a fluid with a refractive index of 1.105 at 25° C. and a viscosity of 6400 centistokes at 25° C. The average molecular weight of this fluid was 1170.

Example 6

A mixture was prepared of 288.4 parts by weight of $(BrCH_2)_2SiC_6H_5Br$ and 176.4 parts of $BrCH_2SiCH_3C_6H_5Br$. This mixture was gradually added to 182.5 parts of molten potassium suspended in 520 parts of refluxing toluene. The reaction was exothermic and the heat was dissipated by air blowing. The mixture was then heated for 4 hours at a temperature of from 100 to 110° C. The slurry which had formed was filtered and the filtrate stripped of toluene and distilled. A low boiling product was removed at 25 mm. pressure following which a residue was obtained. This latter product was a copolymeric fluid which contained the units

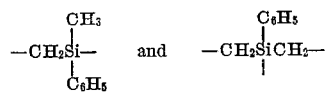

The compounds $(BrCH_2)_2SiC_6H_5Br$ and $BrCH_2SiCH_3C_6H_5Br$ may be prepared by the bromination of the known compound $(CH_3)_2SiBr_2$ by the method set forth in the copending application of John L. Speier, Serial No. 166,989, filed simultaneously herewith. The principal product of such a bromination is the compound $BrCH_2CH_3SiBr_2$ but small amounts of the compound $(BrCH_2)_3SiBr_2$ are also obtained. These latter two materials may then be phenylated by reacting each with one mol of phenylmagnesium chloride.

Example 7

231 parts by weight of $(ClCH_2)_2SiCH_3Cl$ and 186 parts of $ClCH_2Si(CH_3)_2Cl$ were mixed and gradually added to 149.5 parts of molten sodium suspended in 520 parts of refluxing toluene. The reaction was exothermic and the heat was dissipated by air blowing. The mixture was then heated for 4 hours at a temperature of from 100 to 110° C. The slurry which had formed was filtered and the filtrate stripped of toluene and distilled. Distillation removed the low boiling product at 25 mm. pressure following which about 80 parts of a residue were obtained. This latter product was a fluid with a refractive index of 1.579 at 25° C. and a viscosity of 15,035 centistokes at 25° C. The average molecular weight of this product was 1250.

That which is claimed is:

1. Copolymeric fluids containing from 50 to 95 mol per cent of the units $$-CH_2Si-\\\quad R_2$$

and from 5 to 50 mol per cent of the units $$-CH_2\overset{R}{\underset{|}{Si}}CH_2-$$

in which R is a radical each selected from the group consisting of alkyl and monocyclicaryl radicals and in which said units are bonded together by linkage of the free carbon bonds to the free silicon bonds of said units.

2. A copolymeric fluid in accord with claim 1 in which R represents a methyl radical.

3. A copolymeric fluid in accord with claim 1 in which some R's represent phenyl radicals and the remainder of the R's represent methyl radicals.

4. The method which comprises reacting a mixture of from 50 to 95 mol per cent of $XCH_2SiR_2X$ and from 5 to 50 mol per cent of $(XCH_2)_2SiRX$ in which each X represents a halogen atom and R represents a radical each selected from the group consisting of alkyl and monocyclicaryl radicals with an alkali metal, whereby there is produced a copolymeric fluid containing the units $$-CH_2Si- \quad \text{and} \quad -CH_2\overset{R}{\underset{|}{Si}}CH_2-\\\quad R_2$$

in which said units are bonded together by linkages of the free carbon bonds to the free silicon bonds of said units.

5. The method in accord with claim 4 in which R represents a methyl radical.

6. The method in accord with claim 4 in which some R's represent phenyl radicals and the remainder of the R's represent methyl radicals.

JOSEPH D. FRANCIS.

No references cited.